UNITED STATES PATENT OFFICE.

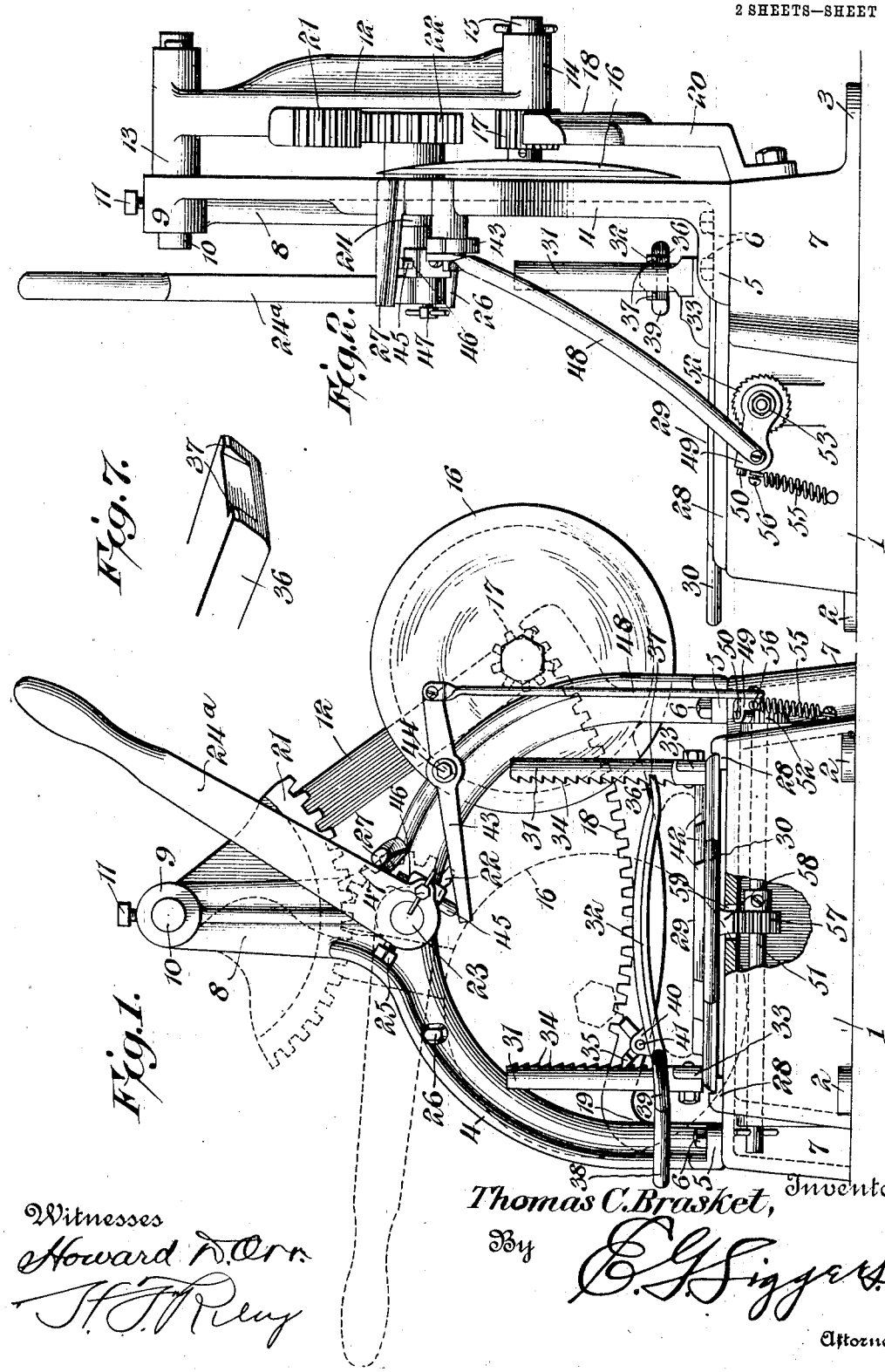

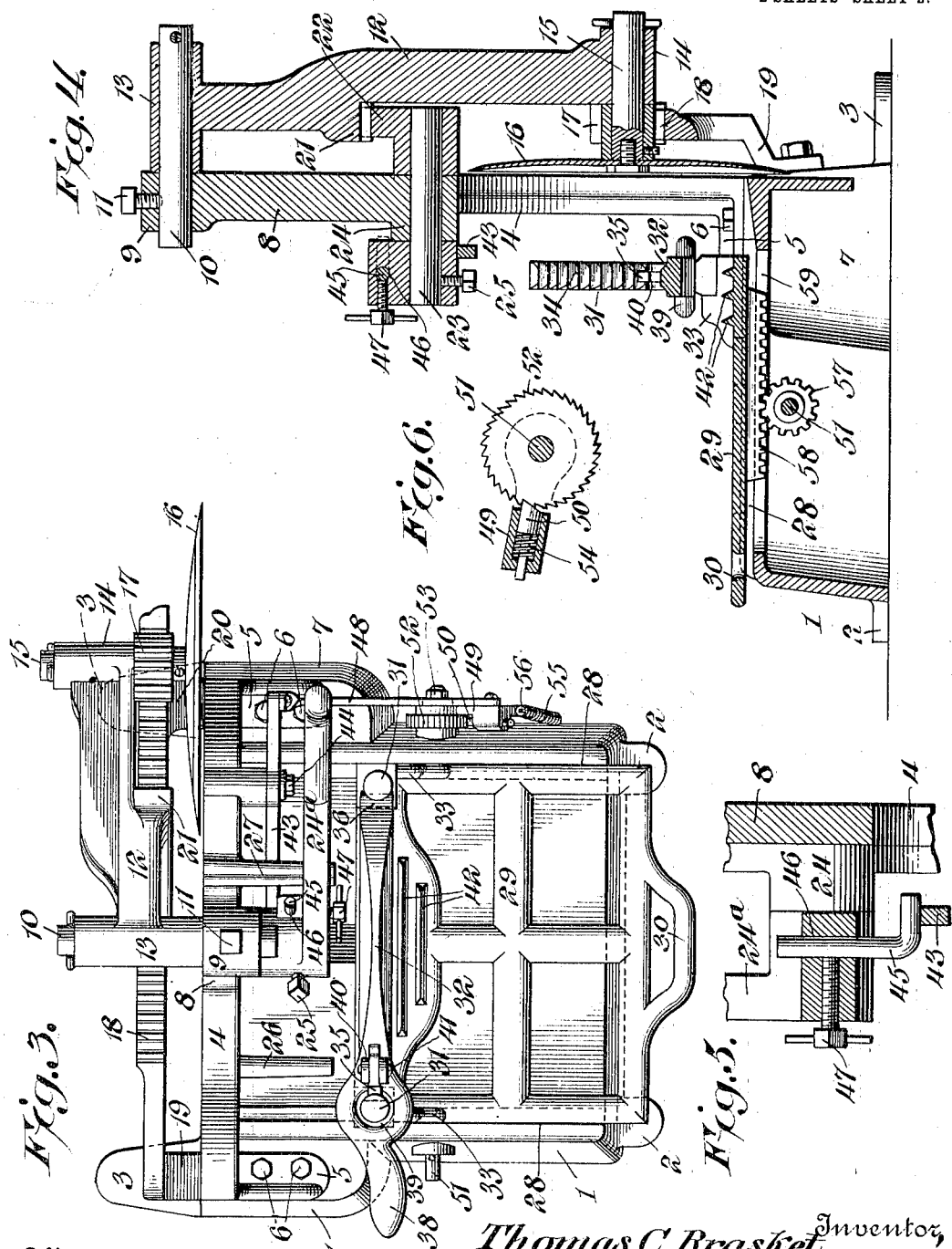

THOMAS C. BRASKET, OF ANDERSON, INDIANA.

MEAT-SLICER.

951,050.   Specification of Letters Patent.   Patented Mar. 1, 1910.

Application filed July 17, 1908. Serial No. 444,021.

*To all whom it may concern:*

Be it known that I, THOMAS C. BRASKET, a citizen of the United States, residing at Anderson, in the county of Madison and State of Indiana, have invented a new and useful Meat-Slicer, of which the following is a specification.

The invention relates to improvements in meat slicers.

The object of the present invention is to improve the construction of meat slicers, and to provide a simple and comparatively inexpensive machine, capable of easy operation to cut meat, or other material into slices of uniform thickness, and adapted to automatically feed the material to the knife at the end of each cutting operation.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a rear elevation of a meat slicer, constructed in accordance with this invention. Fig. 2 is a side elevation of the same. Fig. 3 is a plan view. Fig. 4 is a central longitudinal sectional view. Fig. 5 is a detail sectional view, illustrating the construction of the adjustable projection or finger for operating the feeding mechanism. Fig. 6 is a detail sectional view, illustrating the construction of the spring actuated pawl and the ratchet wheel. Fig. 7 is a detail view of the engaging end of the meat engaging member.

Like numerals of reference designate corresponding parts in all the figures of the drawings.

The frame of the machine comprises a hollow substantially rectangular base 1, provided with front and rear horizontal extensions or feet 2 and 3, arranged to rest upon the supporting surface to provide an enlarged base for increasing the stability of the machine. Mounted upon the base at the front portion thereof is a transversely disposed arched support 4, provided at the lower end of its sides with rearwardly extending horizontally disposed attaching flanges or portions 5, which are secured by screws 6, or other suitable fastening devices to the upper faces of lateral extensions 7 of the base. The arched support is provided at the top with a centrally arranged upwardly extending arm 8, having a bearing 9 at its upper end for the reception of a short forwardly projecting horizontal shaft 10, secured in the bearing 9 by means of a set screw 11, or other suitable fastening device and forming a pivot for an oscillatory knife carrying arm 12.

The oscillatory knife carrying arm, which is provided at it supper end with an integral sleeve or bearing 13 for the shaft or pivot 10, has a lower sleeve or bearing 14 at its lower end for the reception of a horizontal shaft 15, carrying a rotary circular knife 16 and a pinion 17. The rotary knife, which is beveled at its periphery to provide a cutting edge, is suitably secured to the rear end of the shaft 15, and the pinion, which is located in advance of the knife, fits against the rear face of the lower end of the oscillatory arm and meshes with a fixed curved rack 18, whereby when the arm is oscillated to swing the knife from one side of the machine to the other, the said knife will be rotated, thereby producing an effective and rapid cutting of the meat, or other material.

The curved rack is provided at its ends with depending integral supporting arms 19 and 20, having off-sets or bends, which space the curved rack from the arched support and providing an intervening space or passageway for the rotary knife 16. The oscillatory arm is provided at an intermediate point with an integral rack 21, convexly curved and located above and meshing with a mutilated gear 22 of a short horizontal shaft 23, journaled in a suitable bearing 24 at the lower end of the upwardly extending arm of the arched support. The gear 22 is located in advance of the arched support of the frame, and the shaft 23, which projects rearwardly from the said support, is operated by means of an oscillatory arm or lever 24ª, having an outer handle or grip portion and provided at its inner end with an opening for the said shaft 23. The inner end of the operating hand or lever 24 is secured to the shaft 23 by a set screw 25, or other suitable means, and the inner or lower end of the operating lever is maintained in fixed relation with the frame of the machine by the said shaft. When the operating arm or lever is oscillated, the shaft 23 is partially rotated and motion is communicated through the mutilated and the curved rack 21 to the knife carrying arm, which is swung transversely of the machine, and the oscillatory movement of the arm rotates the knife through the pinion 17 and the fixed curved rack 18. The arched support is provided with rearwardly extending projections 26 and 27, arranged in the path of the operating arm or lever 24 and forming stops for limiting the movement of the same.

The base of the machine is provided at its upper face with parallel guides or ways 28, consisting of ribs or enlargements having horizontal supporting faces for the reception of a meat carrier 29 and provided with vertical flanges, located at the outer edges of the said supporting faces for retaining the meat carrier thereon. The meat carrier, which is rectangular, is provided with openings to lessen its weight, and it has a grip or handle 30 at the rear end. It is equipped at its front end with a clamp composed of spaced vertical posts or members 31, and a transversely disposed meat engaging member 32. The posts or upright members 31, which are bolted at their lower ends to flanges 33, are provided at their inner sides with teeth 34, and the meat engaging member which is fulcrumed on one of the posts or members, is movable bodily into and out of engagement with the same, and is provided with a pivot dog 35 for engaging the teeth of the other post or member. The end 36 of the meat engaging member is tapered for engaging the teeth of the proximate post or member, and is provided with shoulders 37 to form stops for engaging the post or member to prevent the end 36 from moving laterally out of engagement with the same. The other end of the meat engaging member is shaped into a handle or grip 38, and the said meat engaging member is provided at the inner end of the handle or grip with an opening 39 through which the adjacent post or member 31 passes.

The dog 35, which is L-shaped, is located at the inner side of the opening 39 and is pivoted between a pair of ears 40 by a rivet 41, or other suitable fastening device. The outer arm of the L-shaped dog is beveled at the end for engaging the teeth 34 of the adjacent post or member 31, and the inner arm forms a handle or operating portion for enabling the dog to be readily swung out of engagement with the said teeth for releasing the meat clamping member. The outer arm of the pawl, which is heavier than the inner arm, is adapted to swing outwardly into engagement with the post or member through gravity, and when the handle end of the meat engaging member is forced downwardly, it is locked against upward movement by the dog, which automatically engages the teeth of the post or member. In securing the meat, or other material to the carrier, the engaging or clamping member is fulcrumed on the post or member 31 at the right hand side in Figs. 1 and 3 of the drawings, and the handle end of the clamping member is forced downward through the material and tightly clamped on the carrier. The clamping member operates as a lever, and enables the necessary pressure to be readily applied. The meat carrier is provided at the front with upwardly projecting transversely disposed flanges 42, tapered in cross section, as clearly illustrated in Fig. 4 of the drawings to grip the meat, or other material and prevent the same from slipping.

The carrier is automatically advanced the thickness of a slice at the end of each cutting movement by means of feeding mechanism including rack and pinion gearing, ratchet mechanism for imparting a step by step movement to the rack and pinion gearing, and a lever 43, arranged in substantially a horizontal position, when it is not depressed by the operating arm or lever and fulcrumed at an intermediate point on the arched support by means of a screw 44, or other suitable fastening device. The inner arm of the lever is arranged in the path of an adjustable finger or projection 45, consisting of an L-shaped piece having its long arm adjustably secured in a perforation 46 of the inner end of the operating arm or lever by a set screw 47. The projection or finger 45 is adjustable in a direction longitudinally of the operating arm or lever, and its short arm, which is located at the outer end of the projection or finger, is arranged to engage the inner arm of the lever 43 and is carried into and out of engagement with the same by the oscillatory movement of the operating arm or lever.

The projection or finger is adjustable inward and outward to vary the movement of the lever 43, and the consequent feed of the meat carrier.

The outer end of the lever 43 is connected by a rod 48 with an oscillatory arm 49, carrying a spring actuated dog 50 and mounted on a transverse shaft 51 at one side of the base of the frame of the machine. The arm 49, which extends rearwardly from the shaft 51, oscillates independently of the rotary movement of the shaft and is adapted to rotate the latter forwardly by means of the pawl 50 and a ratchet wheel 52, keyed or otherwise fixed to the shaft. The arm 49 is loosely mounted on the shaft 51 by a nut 53, or other suitable fastening means, and its outer portion is enlarged and provided with a longitudinal bore or opening to form a casing or housing for the pawl 50, which is held in engagement with the ratchet wheel 52 by means of a coiled spring 54. The teeth of the ratchet wheel are shouldered at the rear face, and the ratchet wheel is rotated forwardly when the lever 43 is actuated by the operating arm or lever 24, the downward movement of the inner arm of the lever 43 operating to swing the arm 49 upwardly. The engaging end of the pawl is beveled and the ratchet wheel moves with the arm 49 when the latter is swung upwardly. The arm 49 and the lever 43 are returned to their initial positions by means of a coiled spring 55, extending downwardly from the arm 49 and secured at its lower end to the base 1 and connected at its upper end to the said arm by means of a screw 56.

The shaft 51 extends across the base, and it carries a pinion 57, secured by a set screw, or other suitable means to the shaft and meshing with a longitudinal rack 58 of the meat carrier. The rack 58, which depends from the lower face of the meat carrier, extends through a slot 59 of the top of the base. When the transverse shaft is rotated, motion is communicated through the pinion 57 and the rack 58 to the meat carrier, which is advanced toward the knife. The rack is of sufficient length to permit the carrier to move outwardly to a point close to the knife, but it is not long enough to cause the carrier to come in contact with the knife, and the forward movement of the carrier is limited by the front wall of the slot or opening 59, which constitutes the stop for engaging the front end of the rack bar. The meat carrier is readily lifted out of engagement with the pinion by the grip or handle, and is drawn rearwardly either to readjust the meat or to clamp other material on the carrier. One or more pieces of meat may be clamped to the carrier so as to project in advance of the latter, and after the projecting portion is sliced, the meat may be readjusted and again sliced, the operation being continued until the meat is sliced as far as possible.

The movement of the operating arm or lever 24 from the dotted position in Fig. 1 to the position shown in full lines in the said figure carries the knife from one side of the machine to the other and operates the feeding mechanism to advance the meat carrier a distance equal to the thickness of a slice, and the meat is cut during the movement of the operating arm or lever from its innermost position illustrated in full lines in Fig. 1 of the drawings to its outermost position shown in dotted lines in the said figure. The operating arm or lever is then swung backwardly or inwardly to feed the meat, and the cutting operation is then repeated.

Having thus fully described my invention, what I claim as new and desire to secure by Letters Patent, is:—

1. A machine of the class described including a frame, an oscillatory arm pivoted at its upper end to the frame, a rotary knife carried by the lower end of the arm, a rack mounted on the arm and located above the knife, an oscillatory lever pivoted to the frame at a point below the pivot of the arm and maintained in fixed relation with the said frame, and a gear connected with the lever and meshing with the rack for oscillating the arm.

2. A machine of the class described including a frame, an oscillatory arm pivoted at its upper end to the frame and provided with a rack carried by the upper portion of the arm, a rotary knife mounted on the lower end of the arm, an oscillatory lever pivoted to the frame and maintained in fixed relation with the same, a gear connected with the lever and meshing with the rack for oscillating the arm, a pinion carried by the arm and connected with the knife, and a relatively fixed rack arranged to mesh with the pinion, whereby the knife will be rotated when the arm is oscillated.

3. A machine of the class described including a frame, an oscillatory arm pivoted at its upper end to the frame and provided with a curved rack located at the upper portion of the said arm, a rotary knife carried by the lower portion of the arm, a rotary gear meshing with the rack, a pinion carried by the arm and connected with the knife, a relatively fixed rack curved concentric with the said rack and meshing with the pinion, whereby the knife will be rotated when the arm is oscillated, and an oscillatory operating lever pivoted to a fixed portion of the frame and connected with the gear for rotating the same to oscillate the arm.

4. A machine of the class described comprising a support, an oscillatory arm pivoted at its upper end to the support, a knife carried by and located at the lower end of the arm, a shaft mounted on the support and maintained in fixed relation with the same, an operating lever mounted on one end of the shaft, and means connecting the other end of the shaft with the oscillatory arm for actuating the same.

5. A machine of the class described including a frame having a fixed support, a fixed rack spaced from the support, an oscillatory arm pivoted to the support and provided above the said rack with a rack carried by the said arm, a knife operating in the space between the fixed rack and the support, a pinion also carried by the arm and connected with the knife and meshing with the fixed rack, and operating mechanism mounted on the support and including a gear meshing with the rack of the oscillatory arm.

6. A machine of the class described including a base, a fixed support extending upwardly from the base and located at the front end thereof, a fixed transversely disposed rack arranged at the front of the base and spaced from the support, an oscillatory arm pivoted at its upper end to the support and arranged to swing transversely of the machine and provided at an intermediate point with a rack, a knife mounted on the arm at the lower end thereof, a pinion carried by the lower end of the arm and connected with the knife and meshing with the fixed rack, a shaft journaled on the support, a gear carried by the shaft and meshing with the rack of the oscillatory arm, and an oscillatory arm or lever connected with the shaft for actuating the same.

7. A machine of the class described comprising cutting mechanism, a carrier provided with a clamp including fixed posts mounted on the carrier and provided at their inner faces with ratchet teeth, a clamping member extending across the space between the post and having one end beveled to engage the teeth of one of the posts and movable bodily into and out of engagement with the same and provided at opposite sides with shoulders to prevent the beveled end from slipping laterally, and a dog mounted on the clamping member and coöperating with the teeth of the other post.

8. A machine of the class described including an oscillatory arm provided with cutting mechanism, operating mechanism for the oscillatory arm including an oscillatory operating lever, a carrier, feeding mechanism for actuating the carrier, and means projecting from the operating lever and arranged to strike the feeding mechanism for operating the same.

9. A machine of the class described including an oscillatory arm, cutting mechanism carried by the same, operating mechanism including an oscillatory operating lever, a carrier, feeding mechanism comprising a rack and pinion, ratchet mechanism for actuating the rack and pinion gearing, a lever connected with the ratchet mechanism, and means projecting from the operating lever and arranged to strike the lever of the feeding mechanism.

10. A machine of the class described including an oscillatory arm, cutting mechanism carried by the arm, operating mechanism for the arm including an oscillatory operating lever, a carrier, feeding mechanism for moving the carrier toward the cutting mechanism provided with a lever, and an adjustable member projecting from the operating lever and arranged to strike the lever of the feeding mechanism for actuating the same.

11. A machine of the class described including an oscillatory arm, a knife carried by the arm, operating mechanism for the arm provided with an oscillatory operating lever, a substantially L-shaped finger or projection adjustably mounted on the arm, a carrier, and feeding mechanism for moving the carrier toward the knife having a lever arranged to be actuated by the said finger or projection.

In testimony, that I claim the foregoing as my own, I have hereto affixed my signature in the presence of two witnesses.

THOMAS C. BRASKET.

Witnesses:
ARTHUR C. CALL,
G. W. PETTIGREW.